April 18, 1967 T. R. BAKER ETAL 3,314,555

ARTICLE TRANSFER DEVICES

Filed June 7, 1965 11 Sheets-Sheet 1

INVENTORS
Thomas R. Baker
Thomas B. Brickson
BY
Howard G. Russell
their ATTORNEY INVENTORS
Thomas R. Baker
Thomas B. Brickson
BY Howard G. Russell
their ATTORNEY INVENTORS
Thomas R. Baker
Thomas B. Brickson
BY
Howard G. Russell
Their ATTORNEY INVENTORS
Thomas R. Baker
Thomas B. Brickson
BY
Howard G. Russell
their ATTORNEY INVENTORS
Thomas R. Baker
Thomas B. Brickson
BY
Howard G. Russell
their ATTORNEY INVENTORS
Thomas R. Baker
Thomas B. Brickson
BY
Howard G. Russell
their ATTORNEY INVENTORS
Thomas R. Baker
Thomas B. Brickson
BY
Howard G. Russell
their ATTORNEY INVENTORS
Thomas R. Baker
Thomas B. Brickson
BY
Howard E. Russell
their ATTORNEY April 18, 1967 T. R. BAKER ETAL 3,314,555

ARTICLE TRANSFER DEVICES

Filed June 7, 1965 11 Sheets-Sheet 9

INVENTORS
Thomas R. Baker
Thomas B. Brickson
BY
Howard G. Russell
their ATTORNEY

ARTICLE TRANSFER DEVICES

INVENTORS
Thomas R. Baker
Thomas B. Brickson
BY
Howard E Russell
their ATTORNEY

INVENTORS
Thomas R. Baker
Thomas B. Brickson
BY
Howard G. Russell
their ATTORNEY 3,314,555

ARTICLE TRANSFER DEVICES

Thomas R. Baker, Los Altos, and Thomas B. Brickson, Palo Alto, Calif., assignors to Kliklok Corporation, New York, N.Y., a corporation of Delaware Filed June 7, 1965, Ser. No. 461,716
11 Claims. (Cl. 214—1)

This invention relates to the art of mechanically handling, transferring, loading or packaging of articles of merchandise, for example food products. More particularly, it relates to the packaging of vulnerable stick or bar shaped articles in folding boxes in which the articles are placed in orderly rows, there being one, two or more layers of such rows.

A specific example is the packaging of fish sticks in folding boxes, for example in two layers, each layer containing four or six sticks. Other articles which may be similarly handled and packaged are bakery products such as cookies, chocolates in bar form, the common denominator of these articles being that the articles to be handled and loaded are of approximately the same dimensions, yet somewhat irregular in shape, and vulnerable to rough handling, as they may crush, chip or break.

A preferred loading or packaging procedure involves the movement of the boxes along a box track past as many loading stations as there are layers to be placed in each box. If, therefore, layers of four or six articles are to be placed in the boxes, a particular box receives four or six articles at a first station. These constitute the first layer. The box then moves on to a second station where a second layer of four or six articles is put on top of the bottom layer, and this procedure is repeated, if there are to be more than two layers.

The articles are supplied to the several loading stations in parallel lanes. A two layer loading device which is to load rows of six articles, accordingly, requires a minimum of twelve supply lanes. Its capacity may be doubled by loading two boxes at a time at each station. This arrangement would then require a total of twenty-four layers.

In order to avoid incompletely loaded boxes from being delivered, inspection and supplemental hand loading at a point downstream of the loading mechanism may be provided. This is generally regarded as an unsatisfactory remedy. Following the approach of the present invention the entire mechanical loader or transfer device is automatically maintained in operative as long as there is a shortage of articles in any one lane. For this purpose each of the supply lanes is equipped with a sensor or testing device capable of stopping the entire loading or transfer mechanism whenever there is a shortage of product in any one lane.

Multiple packaging poses numerous problems, one of the principal problems being accuracy of placement of the articles. This problem is aggravated in instances where the articles are of irregular shape. The present invention solves this particular difficulty by a positive handling of the articles from the time they are picked up at a pickup station until they are placed in the boxes at the delivery station and any uncontrollable movement of the articles, such as free movement under the influence of gravity or conveying by friction, is avoided. The positive handling further avoids misalignment of the articles as well as incomplete insertion into the boxes.

The objects, features and advantages of this invention will appear more fully from the detailed description which follows accompanied by drawings showing, for the purpose of illustration, a preferred embodiment of the invention. The invention also resides in certain new and original features of construction and combination of elements hereinafter set forth and claimed.

Although the characteristic features of the invention which are believed to be novel will be particularly pointed out in the claims appended hereto, the invention itself, its objects and advantages, and the manner in which it may be carried out, may be better understood by referring to the following description taken in connection with the accompanying drawings forming a part of it in which:

Figure 1:
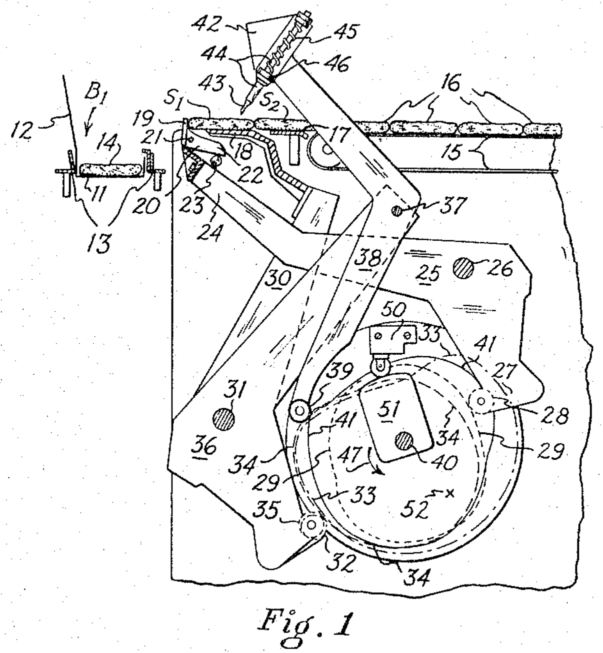
FIGS. 1 to 10 are diagrammatic illustrations of the principal operating mechanism of an article transfer device designed for the handling and packaging of fish sticks, the figures showing the elements of the mechanism in successive stages of operation.

In the following description and in the claims various details will be identified by specific names for convenience. The names, however, are intended to be generic in their application. Corresponding reference characters refer to corresponding parts in the several figures of the drawings.

The drawings accompany, and forming part of, this specification disclose certain specific details of construction for the purpose of explanation of broader aspects of the invention, but it should be understood that structural details may be modified in various respects without departure from the principles of the invention and that the invention may be incorporated in other structural forms than shown.

*Summary of operation*

Reducing the operation of the machine or device incorporating the present invention to the simplest terms, the articles, which in the illustrated example are fish sticks, are advanced in orderly parallel lanes by a common conveyor and finally arrive via a fixed dead plate on a movable pallet plate where they come to rest. A pawl then moves down on the fish sticks from above and clamps the sticks to the pallet. The pallet and the pawls with the fish sticks held therebetween then move jointly on a substantially arcuate path into the bodies of boxes which the sticks enter end first. The pawls hold the sticks in that position of partial insertion while the pallet is pulled out from under the sticks. As a result, the trailing ends of the sticks drop into the boxes under the full control of the pawls.

The pawl and pallet finally return to their pickup position adjacent the dead plate, the conveyor moves the next row of sticks onto the pallet and the operation is repeated.

In the meantime, empty boxes move into the position of boxes which received their bottom layer of sticks, and the latter move to a second loading station where they receive the top layer of sticks during the next cycle of operation.

*Cam mechanism*

While the motions of the various elements may be produced by crank and lever systems, it is preferred to employ rotating cams for the purpose.

As the multicam mechanism is of some complexity and since it is difficult to explain the simultaneous actions of several cam-operated elements by reference to conventional mechanical drawings, a scale model of the various cam mechanisms was prepared. The model was moved through a number of successive positions representative of a complete cycle of operation. These positions were photographed and the photographs were traced and are reproduced as FIGS. 1 to 10, which will first be described.

After the consideration of FIGS. 1 to 10, the details of the device or machine shown in FIGS. 11 to 15 are readily explained and understood.

Referring to FIG. 1, a folding box B comprising a box body 11 and a hinge cover 12 rests in a box track 13 in a position to receive a second layer of fish sticks. As shown, the box B contains a first, or bottom, layer 14. For the purpose of this description it will be assumed that the bottom layer 14 of sticks was placed in the box at a previous loading station quite similar to the one illustrated in FIG. 1.

A supply conveyor 15 moves a line 16 of sticks end to end from a point of supply (not shown) on the far right first onto a stationary dead plate 17 and then onto a pallet plate 18.

The first fish stick $S_1$ moves slightly beyond the front edge of the pallet 18 with its leading end and comes to rest against the upright portion 19 of a tiltable end stop 20 pivoted at 21. The lower portion 22 of the movable stop 20 represents a shutter and just clears a light beam passing in a direction normal to the plane of the drawing. The beam is aimed at a photocell 23. In the illustrated deflected position of the end stop 20 its lower shutter-like portion 22 permits the light beam to pass. If the stick $S_1$ were removed the end stop would tilt in a clockwise direction and its shutter portion 22 would interrupt the light beam, thus producing a change in the control signal produced by the photocell 23. The significance of the change of signal will later become apparent.

The end stop 20 is an element of a gate mechanism which controls the flow of product fed by the conveyor 15. The pivotal support 21 of the end stop is on the one end 24 of a gate arm 25, the latter being tiltably supported on a shaft 26. The other end 27 of the gate arm carries a roller 28 which follows the periphery of a gate cam 29.

The gate cam 29 is fixed on a main drive shaft 40 on which several other cams are also fixedly mounted. In order that the peripheral contours of these cams are more readily distinguished, distinctive broken and solid lines are used.

The pallet 18 is mounted on a pallet arm 30 which is tiltable about a shaft 31 and carries a follower 32. The follower 32 is in contact with the periphery of a pallet cam 33.

Two cams are employed for producing a complex motion of the pawl which clamps the fish stick $S_1$ down on the pallet 18.

A pawl mounting cam 34 actuates a follower 35 on a pawl mounting arm 36 which is individually pivoted on the shaft 31. The arm 36 carries a pivot 37 which, as readily seen, moves on an arc having the shaft 31 at its center. The pivot 37 supports a push-down arm 38, the lower end of which carries a follower 39. The follower 39 rides on the periphery of a push-down cam 41 which is also fixed on the common drive shaft 40.

The upper end of the push-down arm carries a pawl assembly enclosed in a pawl housing 42. A fork-like prong or point 43 is mounted on the lower end of a rod 44 which is slidably supported in the housing at an angle with respect to the surface of the pallet 18. The rod 44 is under the tension of a spring 45 whose lower end rests on a flange 46 on the rod and whose upper end bears against the top of the housing. It is readily seen that the forked pawl point 43 prevents the stick $S_1$ from turning and pins it down on the pallet 18 with a force equal to the spring force, if the pawl assembly is moved down toward the pallet 18 by the action of the push-down cam 41.

The operating mechanism further comprises two electric switches and their operating cams. These will be described further below. The switches and switch cams are altogether omitted in FIGS. 3 to 6 for the sake of clarity. FIGS. 1 to 10 further omit springs which are normally employed in order to maintain the several cam followers in contact with their respective cams.

*Operation of cam mechanism*

The operation of the cam mechanism is as follows: A suitable prime mover, for example an electric motor, which will later be described, drives the main drive shaft 40 in a counterclockwise direction as indicated by the arrow 47.

Figure 2:
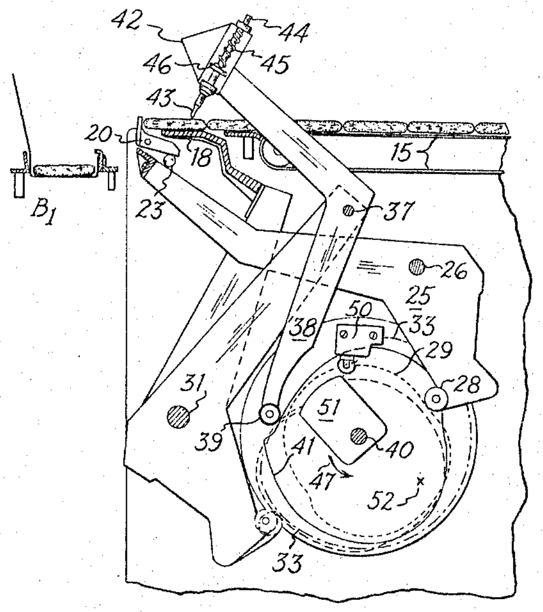

It will be noted that in the position shown in FIG. 1 the follower 39 of the push-down arm 38 has almost reached a point of the cam 41 beyond which the cam periphery recedes causing the push-down arm to tilt and the pawl point 43 to bear down on the stick $S_1$ (FIG. 2). The supply conveyor 15 is at rest and there is no pressure of product 16 on the trailing end of the stick $S_1$.

It will further be noted that at this moment the follower 28 of the gate arm 25 moves onto a rising portion of the gate cam 29 as a result of which the arm 25 is about to tilt in a counterclockwise sense about its axis 26, thereby withdrawing the end stop 20 from the leading end of the stick $S_1$.

Figure 3:
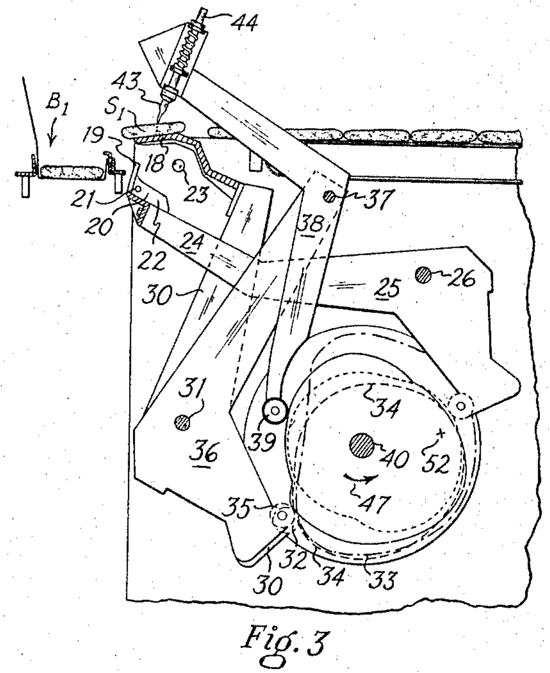

FIG. 3 shows the gate arm tilted and the end stop 20 nearly fully withdrawn. As the lower shutter portion 22 of the end stop is heavier than the remainder of the stop, the stop tilts about the pivot 21 and its lower portion comes to rest on the upper end 24 of the arm 25.

At the instant illustrated in FIG. 3 the follower 35 of the pawl mounting arm 36 moves onto a falling portion of the cam 34. This causes the pivot 37 to swing to the left on an arc about the shaft axis 31. As a result, the pawl point 43 also swings to the left towards the box B.

The pallet 18 follows the motion of the pawl so that pawl and pallet, with the stick $S_1$ clamped therebetween, move towards the box B.

The pallet motion is produced by the pallet arm 30 whose follower 32 moves onto a falling portion of the cam 33.

Figure 4:
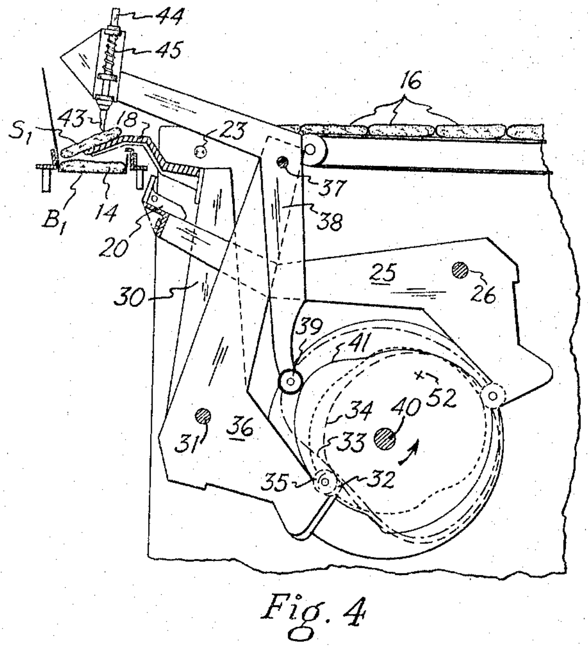

In FIG. 4 the pawl 43, the pallet 18 and the stick $S_1$ held therebetween have reached the end of the forward loading stroke. The leading end of the stick rests on the bottom stick 14 and bears against the rear wall of the box. It is evident that the trailing end of the stick will accurately be placed in the box by the action of the spring 45, if the pallet 18 were now withdrawn from under the stick $S_1$ while the pawl 43 remains in its indicated position.

In FIG. 4 the gate arm is shown in its fully withdrawn position. The follower 32 of the pallet arm 30 is about to move onto a rising portion of the pallet cam 33 for withdrawal of the pallet.

Figure 5:
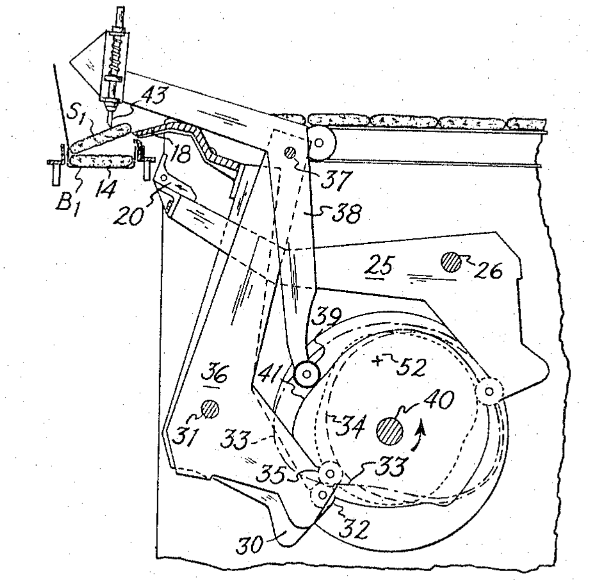

FIG. 5 shows the pallet 18 in the position in which the trailing end of the stick is about to be released, permitting the spring loaded pawl 43 to push the stick fully into the box.

Figure 6:
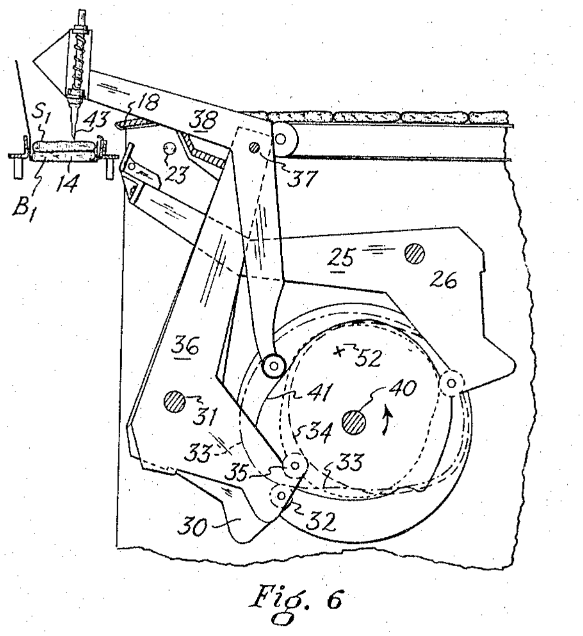

FIG. 6 shows the pallet 18 withdrawn from under the stick $S_1$ and on its way back to its loading position adjacent the dead plate which is hidden behind the push-down arm 38. The stick $S_1$ now rests on the lower layer 14. The box B is filled and will be withdrawn in the direction of the observer, as soon as the pawl 43 retreats.

Figure 7:
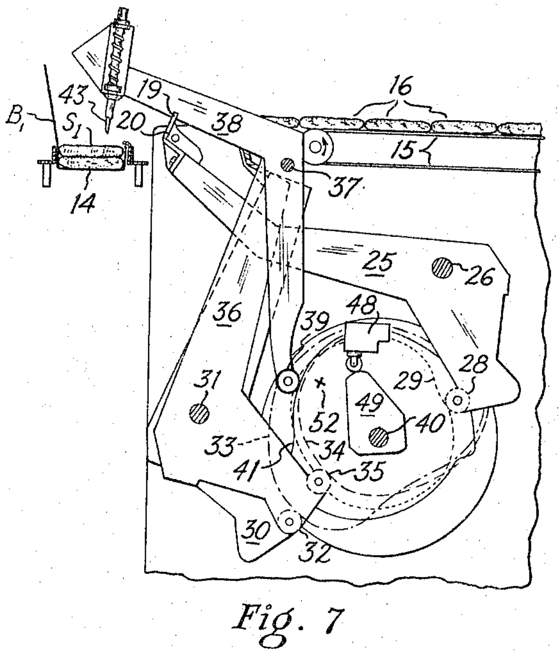

In the position shown in FIG. 7 the pawl 43 has fully released the stick $S_1$ and is being moved to the right by the follower 39 of the push-down arm 38 which moves onto a rising portion of the cam 41 and by the follower 35 of the pawl mounting arm 36 as the follower 35 also moves onto a rising portion of the pawl mounting cam 34.

The end stop 20 of the gate arm 25 has arrived in a position in which its upright portion 19 is in a position to intercept and stop product if the conveyor 15 were to feed product. The shutter arm 22 of the end stop intercepts the light beam aimed at the photocell 23 and produces a signal, the detailed purpose of which will later be explained. Suffice it to say at this point that interruption of the light beam causes a circuit to be prepared which permits the motor of the conveyor 15 to start upon actuation of a further switch. This further switch is shown in FIG. 7 at 48. It is actuated by a switch cam 49 which is fixed on the drive shaft 40. Product 16 is now being supplied by the conveyor 15 and the fish sticks advance to the left until the foremost stick $S_2$ comes to rest against the portion 19 of stop 20.

Figure 8:
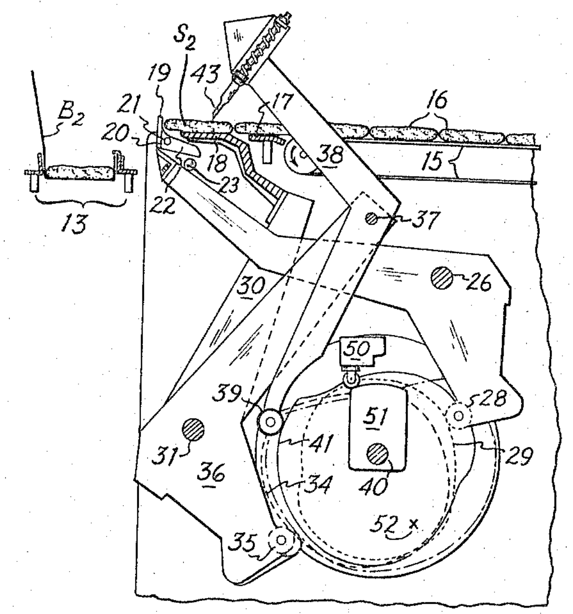

FIG. 8 illustrates the position in which the pallet 18 has returned to the pickup station adjacent the dead plate. The conveyor has pushed sticks to the left and the stick $S_2$ which previously had rested on the dead plate now bears against the stop 20 which tilts at 21 causing its lower shutter portion 22 to expose the photocell 23. Light now strikes the photocell which produces a signal, the effect of which is to stop the conveyor 15.

The filled box $B_1$ was moved away and a second box $B_2$ has taken its place. The operations are then repeated and the next position or phase of operation is represented by FIG. 1.

It will be noted that FIGS. 1, 2, 8, 9, and 10 show a further switch 50 operable by a cam 51 on the shaft 40. The purpose of this switch is to limit the movement of the shaft 40 to one revolution at a time unless conditions exist which justify continued rotation of the shaft. The cycle switch 50 essentially comprises a break contact which, when opened by the action of the cam, causes the shaft drive to be interrupted unless the opening of the circuit in which the switch 50 lies is overruled by other control means which operate as long as there is continued supply of product. Details of a preferred manner in which this may be accomplished will be described further below.

At this point it is sufficient to state that the action of the cam 51 and cycle switch 50 is to bring the shaft 40 to a stop unless a next stick ($S_2$ for example) is in position to be transferred to the next box B. In other words, the transfer mechanism is rendered inoperative as long as there is a shortage of product. By this procedure incomplete filling of boxes is prevented.

The cycle switch 50 is overruled by the photocell under the product supply conditions illustrated in FIGS. 1, 2 and 8.

Figure 9:
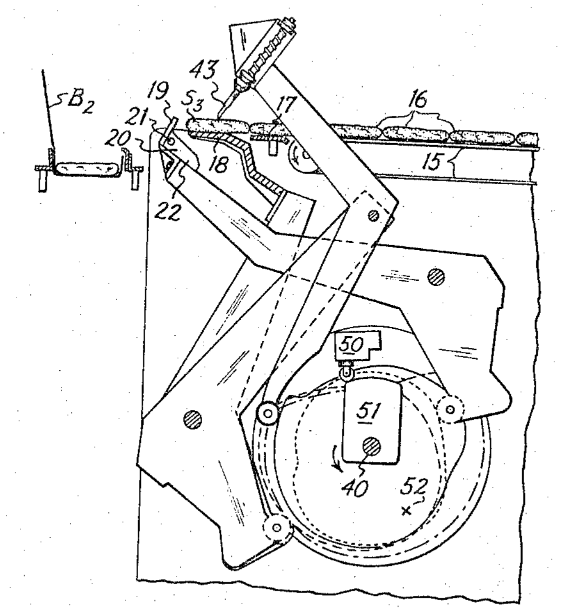

FIG. 9 illustrates a condition in which some delay was encountered in the supply of product 16. At the illustrated instant the supply conveyor 15 is running, but the foremost stick $S_3$ has not yet reached the end stop 20, hence is not yet in a position to be grasped by the pawl and transferred. The shutter arm 22 of the end stop still blocks the light beam and the photocell is incapable of producing a signal overriding the action of the cycle switch 50. The drive shaft will, accordingly, coast to a stop unless in the meantime the stick $S_3$ strikes the portion 19 of the stop 20 and restores the running condition shown in FIG. 1.

Figure 10:
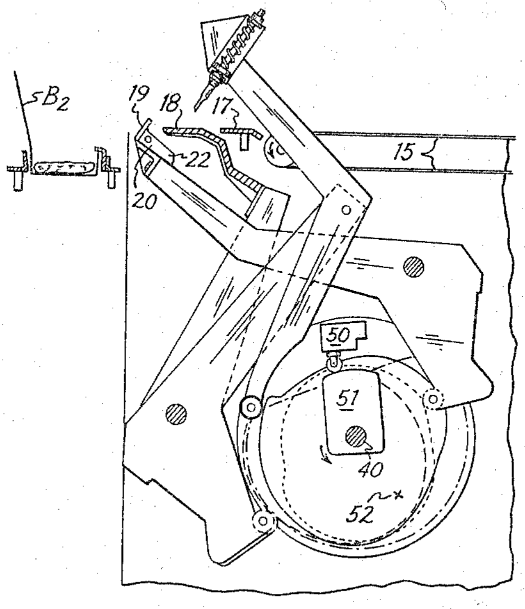

FIG. 10 illustrates the condition in which the supply of product is exhausted. The shutter arm 22 blocks the light beam aimed at the photocell. The cam 51 has caused the switch 50 to open its contacts. As no overriding signal is produced by the photocell the drive shaft 40 with its cams coasts to a stop and comes to rest in the position shown in FIG. 10, a few degrees of rotation beyond the point of opening of the contacts of the switch. The conveyor 15 continues to run and when new product arrives the next loading cycle will commence, the operations of FIGS. 1 through 8 being repeated.

In order to make the rotation of the cams more readily discernible in FIGS. 1 to 10 an $x$ mark 52 was applied to the cam assembly.

*Machine details*

Figure 11:
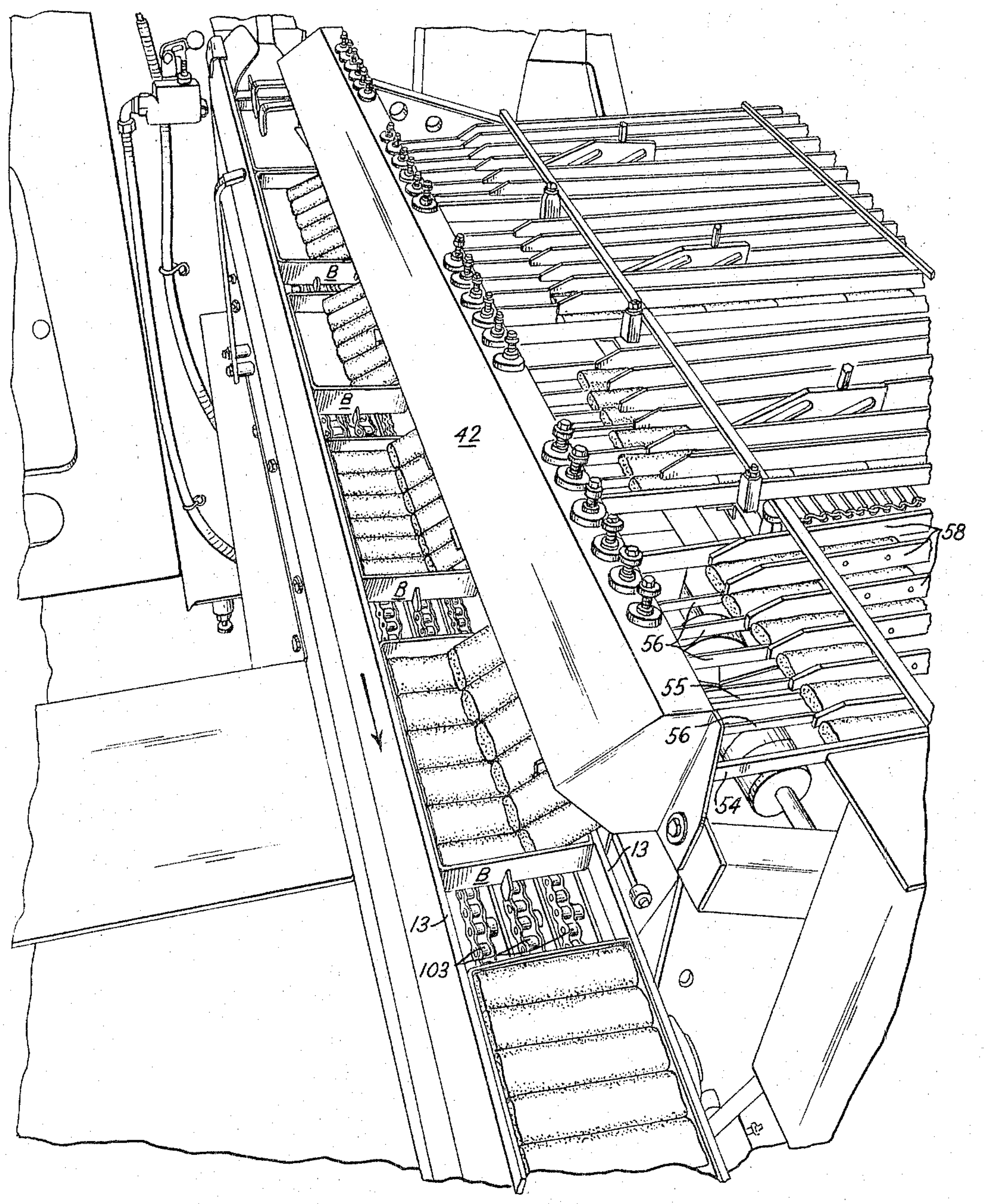
FIG. 11 is a perspective view of a portion of a loading machine incorporating the mechanism diagrammatically shown in FIGS. 1 to 10.

FIG. 11 shows a portion of a fish stick loading machine embodying the mechanism of FIGS. 1 to 10, the specific phase of operation of the machine lying between the position shown in FIGS. 4 and 5.

The boxes B on the track 13 are advanced by a chain conveyor 103. A total of four loading stations are visible for loading four boxes simultaneously. At the two far stations a bottom layer of sticks is placed in the boxes, at the near two stations a top layer of sticks is placed on top of the bottom layer. It is readily seen that the fish sticks within the two far stations may have a steeper inclination than the sticks at the near two stations. This may be accomplished by a difference in the inclination of the pallet plates.

Figure 12:
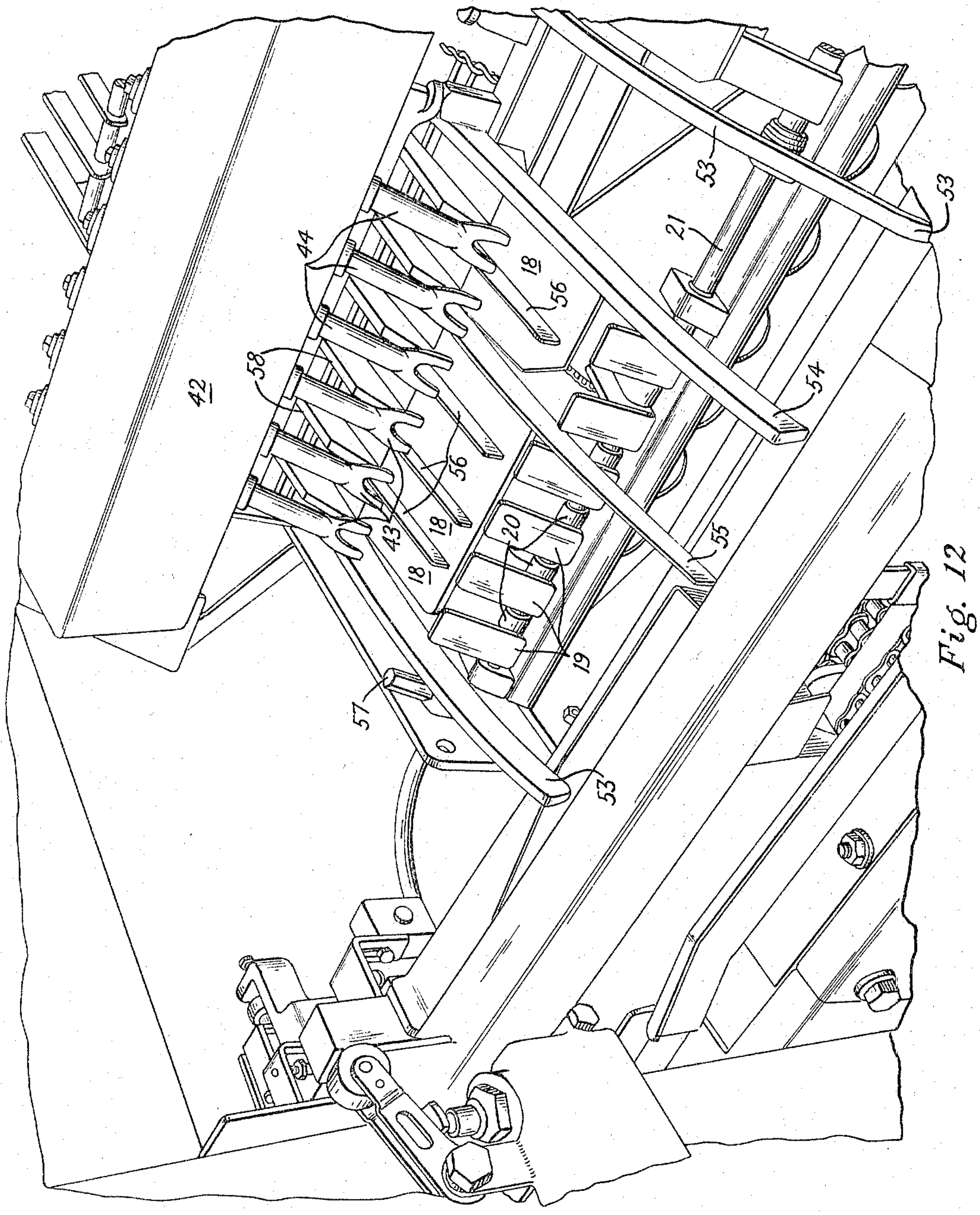
FIG. 12 is a perspective view on an enlarged scale of the far end of the machine portion shown in FIG. 11.

Each station comprises a total of six parallel lanes subdivided into two groups, a group of four and a group of two. This detail is best seen in FIG. 12 showing the loading station farthest to the left in FIG. 11. A total of six pawls protrude from the housing 42, one above each lane. The outer limits of the stations are defined by rigid bars 53 and 54. A thinner, somewhat flexible divider strip 55 subdivides the station into four lanes to the left of the divider 55 and two lanes to the right. The individual lanes are separated by shorter, highly flexible separators 56 of spring material.

At the end of each lane an end stop 20 is mounted, all stops being freely tiltable on a common pivot rod 21.

The illustrated arrangement permits optional loading of short boxes to contain a total of eight fish sticks, or long boxes containing a total of twelve. In the event short boxes are to be loaded the end stops of the two idle lanes are tilted forward by a lever 57, so as not to block the light signal beam with their respective lower shutter portions which are not visible in FIG. 12.

As illustrated, the four end stops 20 on the left are in a position to block the light beam underneath while the two stops on the right are tilted forward, thus simulating the condition of the two right lanes being filled with product. Presence or absence of sticks within only the four left lanes therefore controls the machine in the manner previously described.

Immediately behind each of the forked pawl ends 43 a hold down bar 58 is visible. This bar extends with a slight clearance above the top surface of the fish sticks which move along the lanes and prevents the sticks from being upended under the rearward pressure when each stick tends to push the one in front of it.

The hold down bars are also clearly visible in FIG. 11. This figure illustrates the transfer device in the process of loading the line of boxes B at the left.

Observing the condition of supply of sticks arriving from the right, it will be apparent on the basis of the description of FIGS. 1 to 10 that after the present loading cycle the machine must come to a stop.

Figure 13:
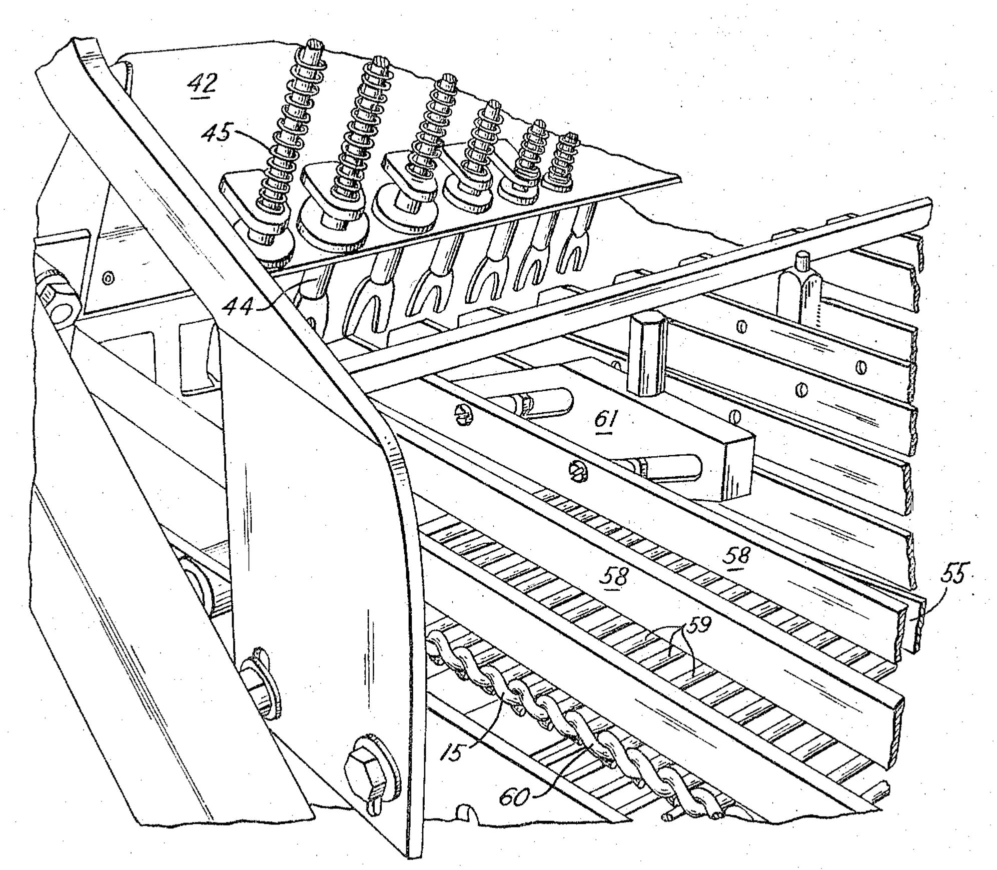
FIG. 13 is a perspective view, on an enlarged scale of a rear portion of the machine.

Turning to FIG. 13, the conveyor 15 which feeds the fish sticks to the left is shown as comprising parallel transverse rods 59 extending across several lanes. The end 60 of each rod is bent forward and looped about the respective forward rod, similar to the links of a chain, so that the entire conveyor resembles a pair of terminal chains with bars extending between the chains, a bar and two terminal chain links being an integral piece of rod (see also FIG. 15).

As seen in FIG. 12, the divider strip 55 between a group of four lanes and the adjacent group of two lanes is laterally flexible. Flexibility is desirable when all six lanes carry product, but undesirable when the two lanes remain empty. In that event, a stabilizing block 61 having a lengthwise bottom slot is moved down on top of the divider 55 and prevents it from being deflected laterally.

Figure 14:
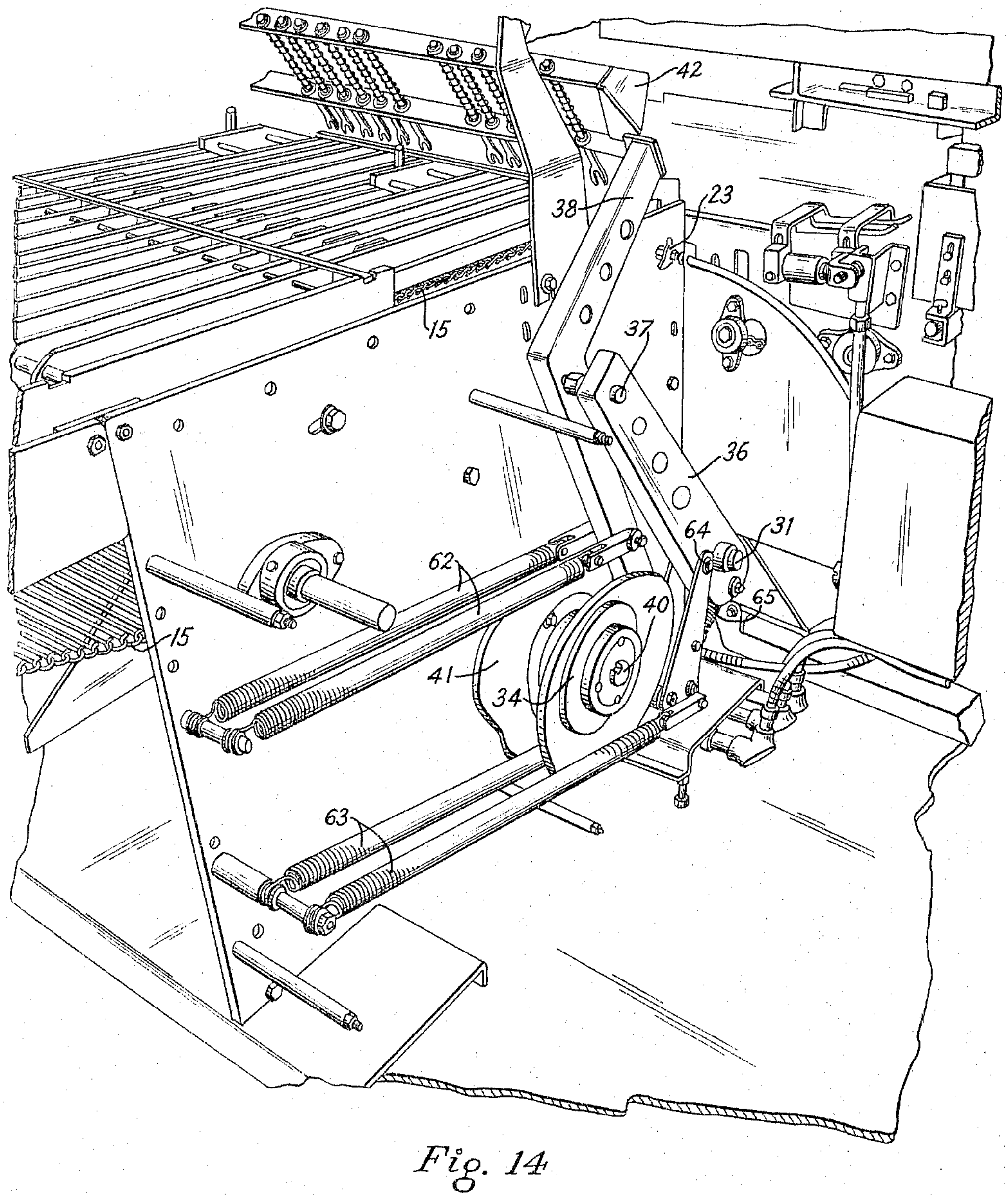
FIG. 14 is a perspective view of the side of that portion of the machine which is shown in FIG. 12.

FIG. 14 shows one end of the loading machine. It is seen that the push-down arm 38 is pulled against the push-down cam 41 by a pair of springs 62. These springs were omitted in FIGS. 1 to 10 for the sake of clarity, as were similar springs 63 which pull the lower end of the pawl mounting arm 36 against its cam 40. The lower end of the arm 36 is actually jointed at 64, the joint being spring loaded at 65. The effect is that the joint behaves like a rigid connection during normal operation, but is capable of yielding somewhat under conditions of overload or jamming which otherwise would damage the mechanism.

Figure 15:
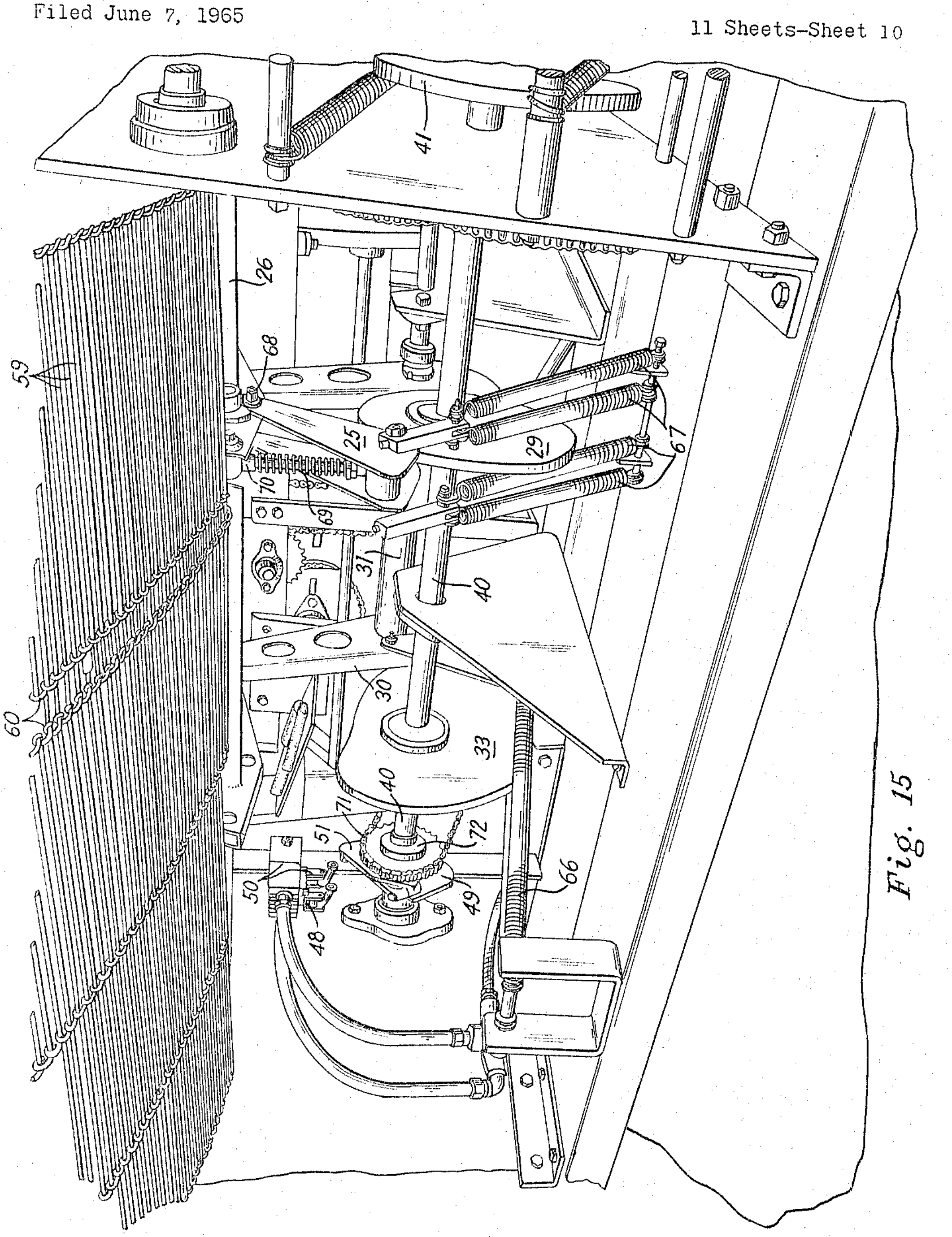
FIG. 15 is a perspective view of the underside of the machine.

FIG. 15 shows pull-back springs 66 which maintain the lower arm of the pallet arm 30 against the pallet cam 33. Further springs 67 pull the gate arm 25 against the gate cam 29. In order to protect the gate mechanism from overload the gate arm 25 is also jointed at 68. Its overload spring 69 encloses a joint rod 70 which limits the degree to which the spring 69 may expand. A similar rod is present in the joint 64.

The shaft 40 is driven by a chain 71 and sprocket gear 72 on the shaft 40. Just beyond the gear 72 the two cams 49 and 51 are visible which actuate the switches 48 and 50, respectively (see FIGS. 7 and 8).

*Electrical controls*

Turning lastly to the electrical components of the transfer device, two separate power drives are provided, one for the conveyor 15, another for the cam shaft 40. Instead of starting and stopping motors, it is preferred to let the motor or motors run continuously and to provide for starting and stopping by a device which in essence is a combination of a clutch and brake electromagnetically operated.

An armature plate on a driven shaft lies in close proximity to a driven disc on one side and a stationary brake disc on the other. Electromagnets are provided to pull the plate against the driven disc, in which event a drive is established, or against the brake disc, in which event the plate and driven shaft are arrested.

Two relays are provided, one for each of the clutch-brake units and, finally, rectifiers to supply direct current to the electromagnets.

Figure 16:
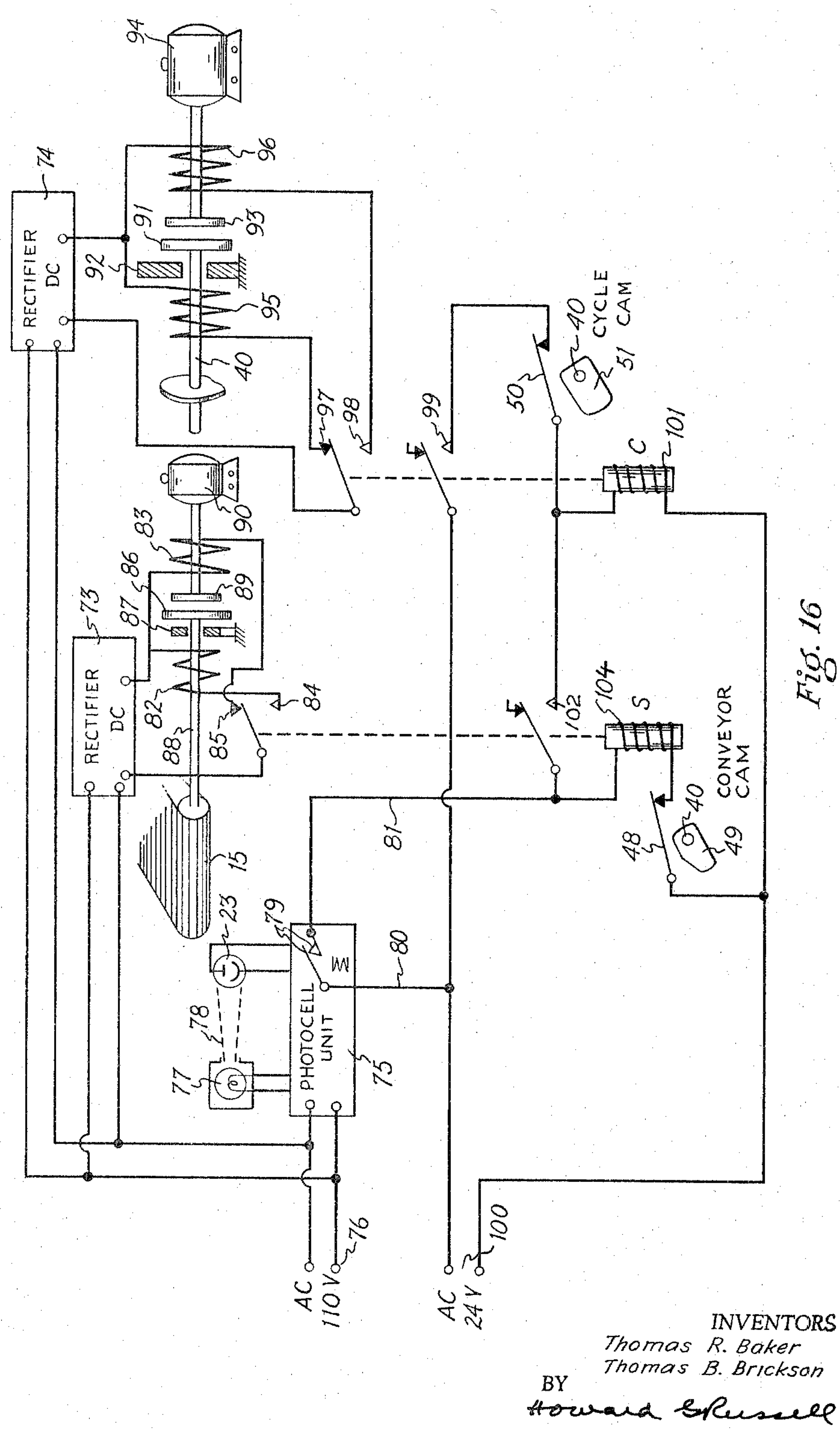
FIG. 16 is a wiring diagram explaining the electrical drive elements and controls of the machine.

FIG. 16 shows the two rectifiers 73, 74 and a photocell unit 75 supplied with A.C. power from a source 76. The rectifier 73 serves a clutch-brake unit for operating the conveyor 15 and the rectifier 74 serves the clutch-brake unit for the cam shaft.

The photocell unit comprises a light source, such as an incandescent bulb 77, directing a beam of light 78 towards the photocell. When the light beam 78 strikes the photocell 23 the unit 75 operates by closing an internal make contact 79 between control leads 80, 81.

The rectifier 73 supplies direct current to electromagnet windings 82, 83 controlled by a make contact 84 and a break contact 85, respectively, which form a part of a supply relay S.

When the winding 82 is energized the armature plate 86 is pulled against the stationary brake disc 87 and the drive shaft 88 of the conveyor 15 is arrested. When the other winding 83 is energized, the plate 86 is pulled into contact with a rotating disc 89 driven by a motor 90.

Similarly, the cam shaft 40 is operated by an armature plate 91 which is either pulled against a brake disc 92 or a drive disc 93 on the shaft of a motor 94. The electromagnet windings 95 and 96 are controlled by a break contact 97 and a make contact 98, respectively, of a cycle relay C.

The cycle relay C comprises a further make contact 99 which lies in a circuit supplying electric current from a source 100 of A.C. power of 24 volts to its field winding 101.

The supply relay S controls a further make contact 102 which supplies power to the winding 101 of the C relay. The winding of the S relay is 104.

The electric controls operate as follows:

When all the lanes are loaded as indicated by the end stops 20 pulling up their shutter portions which interrupted the light beam, the photocell unit closes its contact 79. The S relay becomes energized as follows: From the supply 100, via lead 80, make contact 79, lead 81 to the relay winding 104 and thence via the break contact 48 back to the source 100.

The S relay pulls up its armature opening break contact 85 and closing make contact 84.

Electromagnet 83 is deenergized and the clutch 89, 86 disengages. Electromagnet 82 is energized pulling the plate 86 against the brake disc 87 to the stop the conveyor.

The S relay further closes the make contact 102 which, for the duration of the photocell signal, causes the winding 101 of the C relay to become energized. The C relay pulls up its armature and holds itself over its lower contact 99, the circuit being: From the source 100 via contact 99, cycle switch 50 to the relay winding 101 and thence back to the source 100.

The upper contacts of the C relay reverse, the brake winding 95 is cut off at 97 and the clutch winding 96 is energized. This causes the shaft 40 to start its revolution.

Product is now being loaded, whereafter the pallet and pawl of the transfer mechanism return to the pickup station.

Shortly before the pallet arrives at the pickup station (FIG. 6) the conveyor control cam 49 breaks the contact 48 and cuts the S relay off.

The S relay opens its lower make contact 102 which disconnects the C relay winding 101 from the control lead 81 of the photocell, but the C relay continues to hold itself over its own lower make contact 99 until the cycle switch 50 is opened by the cycle cam 51.

The S relay also reverses its upper contacts which return to their rest position. As a result the clutch-brake unit of the conveyor changes from braking to driving and product advances in all of the lanes.

Immediately thereafer the conveyor cam 49 disengages from the arm of the break contact, contact 48 closes which prepares a circuit for S relay as follows: From the source via break contact 48 to the relay winding 102 and thence via lead to the photocell unit. This circuit remains open until the light signal indicates that all lanes are filled, whereupon the photocell unit 75 closes its internal contact 79 and completes the circuit for the S relay. The S relay then stops the belt as previously described.

Shortly after the gate arm returns to the pickup station and the several end stops are in position to be actuated by the flow of product in each of the lanes, the cycle switch 50 is opened by the cycle cam 51. The C relay is then cut off and its contacts 97, 98 assume their normal rest position with the result that the cam drive is interrupted and the shaft 40 is braked.

The cycle switch cam 51 keeps the break contact 50 open for a certain portion of its revolution, long enough to permit the cam shaft 40 to come to a stop provided the contact 50 remains broken.

If, however, all the lanes are filled in the meantime, the photocell unit energizes the S relay which then closes its contact 102, thereby energizing the C relay long enough to permit the cam 51 to release the switch arm. There after the C relay holds itself over its own contact 99 and the next cycle of operation continues.

What is claimed is:

1. An article transfer device comprising, in combination, a pallet; a feeder for periodically moving an article onto the pallet; a pawl for grasping and retaining an article on the pallet; first transport means for reciprocating said pallet between a pickup station adjacent said feeder and a delivery station remote from the feeder; second transport means timed with respect to said first transport means for reciprocating said pawl between said pickup station and said delivery station, said second transport means providing for a period of dwell at the delivery station sufficiently long for the first transport means to withdraw the pallet from under said pawl; and means for moving said pawl into article retaining position relatively to said pallet during transport of the latter from the pickup station to the delivery station.

2. A device according to claim 1 in which the pawl is a downwardly directed spring-urged fork.

3. An article transfer device comprising, in combination, a pallet; a feeder for moving articles onto the pallet; a deflectable stop adjacent one end of the pallet adapted to be deflected by an article on the pallet; a pawl for grasping and retaining an article on the pallet; first transport means controlled by said stop for reciprocating said pallet between a pickup station adjacent said feeder and a delivery station; second transport means timed with respect to said first transport means for reciprocating said pawl between said pickup station and said delivery station, said second transport means providing for a period of dwell at the delivery station sufficiently long for the first transport means to withdraw the pallet from under said pawl; means timed with respect to said first transport means for withdrawing said stop to a level below said pallet; and means for moving said pawl towards said pallet to retain an article on said pallet during movement of said pallet from the pickup station to the delivery station.

4. An article transfer device comprising, in combination, a common pallet; a feeder for moving articles onto said pallet in a plurality of parallel lanes; a deflectable stop for each of said lanes, the stop being disposed adjacent one end of the pallet and adapted to be deflected by an article on the pallet in its particular lane; a pawl for each of said lanes for grasping and retaining an article on said pallet in its respective lane position; first transport means jointly controlled by all said stops for reciprocating said pallet between a pickup station adjacent said feeder and a delivery station remote from the feeder; second transport means timed with respect to said first transport means for reciprocating all said pawls as a group between said pickup station and said delivery station, said second transport means providing of a period of dwell at the delivery station sufficient for the first transport means to withdraw the pallet from under said pawls; means for moving said pawls relatively to said pallet to grip articles on said pallet during transport of the latter from the pickup station to the delivery station; and means timed with respect to said first transport means for withdrawing said stops jointly to a level below said pallet.

5. An article transfer device comprising, in combination, a pallet; a dead plate in advance of said pallet; a feeder for moving articles onto said pallet via said dead plate; a movable end stop deflectable by an article moved onto the pallet by said feeder; a pawl for grasping and retaining an article on said pallet; means controlled by said end stop for operating said feeder; transport means controlled by said end stop for moving said pallet and said pawl jointly from a pickup station adjacent said dead plate to a delivery station remote from said dead plate; and means timed with respect to said transport means for moving said pawl relatively to said pallet for gripping an article on, and releasing the article from, said pallet, respectively.

6. An article transfer device comprising, in combination, a pallet; a stationary dead plate in advance of said pallet; a belt conveyor for moving articles onto said pallet via said dead plate, said pallet, dead plate and conveyor being disposed to support articles in substantially the same plane; a deflectable stop adjacent one end of the pallet adapted to be deflected by an article on said pallet; a pawl for grasping and retaining an article on said pallet; means controlled by deflection of said stop for arresting said conveyor; first transport means controlled by said stop for reciprocating said pallet between a pickup station adjacent said dead plate and a delivery station remote from said dead plate; second transport means timed with respect to said first transport means for reciprocating said pawl between said pickup station and said delivery station, said second transport means providing for a period of dwell at the delivery station sufficiently long for the first transport means to withdraw the pallet from under said pawl; and means for moving said pawl toward said pallet for gripping an article on said pallet during transport of the latter from the pickup station to the delivery station.

7. An article transfer device comprising, in combination, a common pallet; a dead plate in advance of said pallet; a belt conveyor for moving articles onto said pallet via said dead plate in a plurality of parallel lanes, said pallet, dead plate and conveyor supporting articles in substantially the same plane; a deflectable stop for each lane, said stop being disposed adjacent one end of the pallet to be deflected by an article moved onto said pallet from the dead plate by said conveyor; a pawl for each of said lanes for grasping and retaining an article on said pallet in its respective lane positions; means jointly controlled by all said stops, when deflected, for arresting said conveyor; first transport means jointly controlled by all said stops for reciprocating said pallet between a pickup station adjacent said dead plate and a delivery station remote from said dead plate; second transport means timed with respect to said first transport means for reciprocating said pawl between said pickup station and said delivery station, said second transport means providing for a period of dwell at the delivery station sufficiently long for the first transport means to withdraw the pallet from under said pawl; means for moving said pawls relatively to said pallet to grip articles on said pallet during transport of the latter from the dead plate to the delivery station; and means timed with respect to said first transport means for withdrawing said stops jointly to a level below said pallet.

8. An article transfer device comprising, in combination, a common pallet; a dead plate in advance of said pallet; a feeder for moving articles onto said pallet via said dead plate in a plurality of parallel lanes; an end stop for each lane; a common carrier on which said end stops are deflectably mounted in positions to be acted upon and deflected by an article moved thereagainst by said feeder; a pawl for each of said lanes for grasping and retaining an article on said pallet in its respective lane position; means jointly controlled by all said end stops for operating said feeder; transport means jointly controlled by all said end stops for moving said pallet and said pawls jointly from a pickup station adjacent said dead plate to a delivery station remote from said dead plate; means timed with respect to said transport means for moving said pawls relatively to said pallet to grip articles on, and release articles from, said pallet, respectively; and means timed with respect to said transport means for moving said common carrier out of, and back into, the path of said pallet prior to movement of the latter towards the delivery station and subsequent to movement of the latter to said pickup station, respectively 9. An article transfer device comprising, in combination, a pallet; a feeder for moving articles onto said pallet; a deflectable stop adjacent one end of the pallet adapted to be deflected by an article on the pallet; a pawl for grasping and retaining an article on the pallet; means operable by deflection of said stop for arresting said feeder; a single cycle operating means controlled by the stop for reciprocating said pallet and said pawl jointly from a pickup station adjacent said feeder to a delivery station and thence back to the pickup station, thus completing the cycle, including means operable by said stop in its non-deflected position for restarting said feeder upon return of the pallet to the pickup station.

10. An article transfer device comprising, in combination, a pallet; a conveyor for moving articles onto said pallet; start-stop drive means for said conveyor; a deflectable stop adjacent one end of the pallet adapted to be deflected by an article on said pallet; a pawl for grasping and retaining an article on said pallet; means operable by deflection of said stop for stopping said drive means; a single cycle operating means operated by deflection of said stop for moving said pallet and said pawl from a pickup station adjacent said conveyor to a delivery station, and thence back to the pickup station, thus completing the cycle; and means actuable by the return of the pallet at the pickup station for restarting said drive means.

11. An article transfer device comprising, in combination, a pallet; a stationary dead plate in advance of said pallet; a conveyor for moving articles onto said pallet via said dead plate; start-stop drive means for said conveyor; a sensor responsive to the presence of an article on said pallet; a pawl movable towards, and away from, said pallet for grasping and retaining an article thereon; means controlled by the sensor for stopping said drive means; a first transport means for reciprocating said pallet between a pickup station adjacent said dead plate and a delivery station remote from the dead plate and back to the pickup station; a second transport means timed with respect to said first transport means for reciprocating said pawl between said pickup station and said delivery station, said second transport means providing for a period of dwell at the delivery station sufficiently long for the first transport means to withdraw the pallet from under said pawl; a single cycle operating means controlled by said sensor for operating said first and said second transport means through a cycle; and means actuated by the return of the pallet to the pickup station for restarting said drive means.

References Cited by the Examiner

UNITED STATES PATENTS

| | | | |
|---|---|---|---|
| 1,885,897 | 11/1932 | Christensen | 214—1 |
| 2,200,708 | 5/1940 | Towne et al. | 221—9 X |
| 2,676,692 | 4/1954 | Bauer | 198—27 |
| 2,852,125 | 9/1958 | Holloway | 214—1 X |
| 2,973,109 | 2/1961 | Gable | 221—9 X |
| 3,040,869 | 6/1962 | Mumma | 214—1 X |

HUGO O. SCHULZ, *Primary Examiner.*

MARVIN A. CHAMPION, *Examiner.*